United States Patent
Gray et al.

(10) Patent No.: US 9,573,630 B2
(45) Date of Patent: Feb. 21, 2017

(54) LIGHT WEIGHT TAILGATE STRUCTURE

(71) Applicant: Ford Global Technologies, LLC, Dearborn, MI (US)

(72) Inventors: Jeffrey Gray, Dearborn, MI (US); Jeffrey Alan Firzlaff, Royal Oak, MI (US); Vince Chimento, Plymouth, MI (US); Joshua Hemphill, White Lake, MI (US); Robert Reiners, Grosse Ile, MI (US); Kevin Laws, Dearborn, MI (US); Gerald E. McLaughlin, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/317,736

(22) Filed: Jun. 27, 2014

(65) Prior Publication Data

US 2015/0375804 A1    Dec. 31, 2015

(51) Int. Cl.
*B62D 33/027* (2006.01)
*B62D 33/037* (2006.01)
*B62D 29/00* (2006.01)

(52) U.S. Cl.
CPC ......... *B62D 33/0273* (2013.01); *B62D 29/008* (2013.01); *B62D 33/037* (2013.01)

(58) Field of Classification Search
CPC .. B62D 33/0273; B62D 29/008; B62D 33/037
USPC ...................... 296/57.1, 50, 146.11
See application file for complete search history.

(56) References Cited

U.S. PATENT DOCUMENTS

| | | | |
|---|---|---|---|
| 5,944,373 A | 8/1999 | Seksaria et al. | |
| 5,947,540 A | 9/1999 | Pariseau et al. | |
| 6,672,642 B1* | 1/2004 | Seksaria | B62D 29/001 296/146.5 |
| 6,843,519 B2 | 1/2005 | Ojanen | |
| 7,690,711 B2* | 4/2010 | McGowan | B62D 33/0273 296/52 |
| 8,979,161 B2* | 3/2015 | Patterson et al. | 296/50 |
| 2005/0057064 A1* | 3/2005 | Kitayama | B62D 33/0273 296/51 |

* cited by examiner

*Primary Examiner* — Jason S Morrow
*Assistant Examiner* — Melissa A Black
(74) *Attorney, Agent, or Firm* — Raymond Coppiellie; Brooks Kushman P.C.

(57) ABSTRACT

A pick-up truck tailgate is disclosed that is constructed of components made of aluminum alloys. A hinge reinforcement and hinge plate reinforce a lower corner of the tailgate. A transversely extending reinforcement, including a U-shaped body, is provided within the tailgate that reinforces the central portion of the tailgate. An access panel is provided on the inner panel of the tailgate and includes a hem and fasteners that are assembled to the inner panel through holes formed inboard of the hem.

9 Claims, 4 Drawing Sheets

LIGHT WEIGHT TAILGATE STRUCTURE

TECHNICAL FIELD

This disclosure relates to the structure of a pick-up truck tailgate constructed from lightweight panels that are less ductile than conventional mild steel panels.

BACKGROUND

The use of lightweight materials including aluminum body panels is increasing due to the need to meet stringent fuel economy goals. Light materials include aluminum, composite fiber reinforced parts, magnesium parts, and the like. These types of materials present challenges due to reduced ductility and formability. In addition, aluminum panels, reinforcements and brackets have reduced tensile strength and are more difficult to weld.

Tailgates for pick-up trucks are generally constructed with an outer panel and an inner panel that are assembled together and both have class-A surfaces that are visible on the vehicle. One problem with manufacturing tailgates includes the need to form surfaces of the panels without splits or wrinkles in the corners of the inner panel. Another problem is that the inner and outer panels must be adequately reinforced to avoid "oil canning," a condition where the panel deflects when pressure is applied to the inner or outer panels. Another problem is the need to provide durable mounting locations for connecting hinges and latches.

This disclosure is directed to addressing the above problems and other problems as summarized below.

SUMMARY

According to one aspect of this disclosure, a pick-up truck tailgate is disclosed that comprises an outer panel and an inner panel that have a bottom wall and two sidewalls at right and left corners. A pair of hinges having a transverse leg and a vertical leg are attached outside each of the corners and are assembled to a pair of reinforcement brackets attached inside the corners. The reinforcement brackets each include a sidewall flange and a bottom flange that are connected by an intermediate portion that forms the hypotenuse of a triangle extending between the transverse and vertical legs of the hinges.

According to other aspects of this disclosure, the intermediate flange of each of the reinforcement brackets may be spaced from the respective right and left corners of the inner panel. The reinforcement brackets may include an upper radiused area between the sidewall flange and the intermediate portion and a lower radiused area between the bottom flange and the intermediate portion. The radiused surfaces function to accommodate part variation and tolerance stack-up in the inner panel and the hinge plate. The tailgate may further comprise a plurality of clinch nuts attached to each of the sidewall flanges and the bottom flanges that are each adapted to receive a threaded fastener to secure the hinges to the inner panel. The transverse leg, the bottom wall and the bottom flange may be assembled together in a face-to-face orientation, and the vertical leg, sidewall and sidewall flange are assembled together in a face-to-face orientation. The reinforcement brackets, the inner panel, and the outer panel are preferably formed from aluminum and the hinge is preferably made of steel.

According to another aspect of this disclosure, a pick-up truck tailgate is disclosed that comprises an outer panel and an inner panel attached to the outer panel. A transversely extending reinforcement is provided that includes a U-shaped body having a radiused surface between an upper leg having an upper flange and a lower leg having a lower flange. The radiused surface is connected with a structural adhesive to an inner surface of the outer panel. The upper and lower flanges are connected by fasteners to the inner panel.

According to other aspects of this disclosure, a latch bracket may be provided that is connected to and extends upwardly from the upper leg of the transversely extending reinforcement that is adapted to support a latch assembly for latching the tailgate in a closed position. The latch assembly may be a mechanical latch assembly or an electronic latch assembly. The tailgate may further comprise a handle reinforcement a lower end of the handle reinforcement is attached to the latch bracket and the handle reinforcement extends to the outer panel and an upper end of the handle reinforcement is attached to the outer panel. The tailgate may further comprise a lower transversely extending reinforcement assembled between the inner and outer panels and disposed below the transversely extending reinforcement.

According to another aspect of this disclosure, a pick-up truck tailgate is disclosed that includes an outer panel and an inner panel defining an access opening. An access cover is provided that has an upper hem formed on an upper flange and a lower hem formed on a lower flange. The access cover defines a plurality of fastener openings on the flanges that are spaced from the hem. A plurality of fasteners are inserted into the fastener openings to connect the access cover to the inner panel.

According to other aspects of this disclosure, the access cover extends transversely across the inner panel from a right sidewall to a left sidewall. The access cover is removable to provide access to a latch assembly and a handle assembly for assembly and service. The tailgate may further comprise a plurality of vertically extending recessed beads formed in the access panel in a central area of the access panel to increase the stiffness of the access panel. The tailgate may further comprise a plurality of vertically extending recessed beads formed in the inner panel in a central area of the inner panel to increase the stiffness of the inner panel. In addition, the tailgate may further comprise a plurality of horizontally extending recessed beads formed in the inner panel on opposite lateral sides of the central area of the inner panel to increase the stiffness of the inner panel.

The above aspects of this disclosure and other aspects will be described below with reference to the attached drawing figures.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
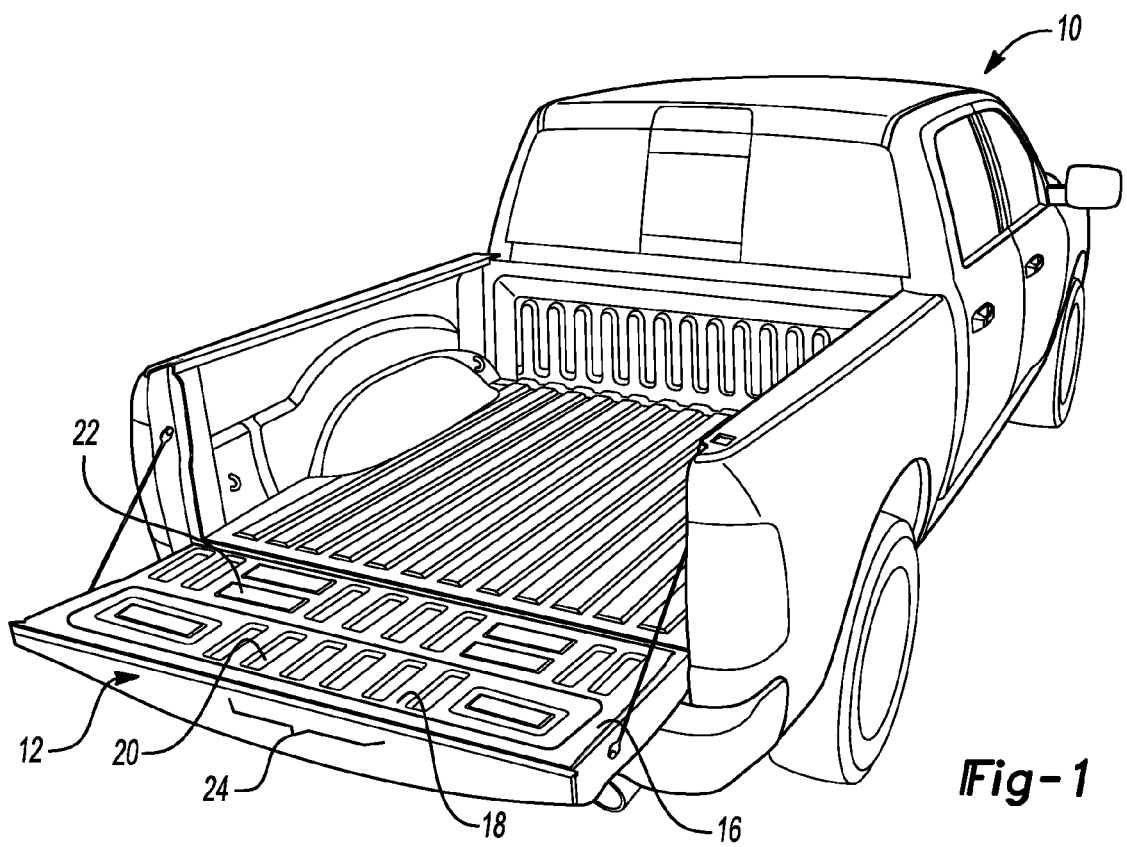
FIG. 1 is a rear right perspective view of a pick-up truck with a tailgate in an open position.

Referring to FIG. 1, a pick-up truck 10 is shown with a tailgate 12 in an open position. The tailgate 12 includes an inner panel 16 and an access panel 18 that is attached to the inner panel 16. A plurality of vertical recesses 20 and horizontal recesses 22 are formed in the inner panel 16 and access panel 18. The vertical recess 20 and horizontal recesses 22 function to stiffen the inner panel 16 and access panel 18. The recesses 20 and 22 also facilitate loading and unloading the pick-up truck 10. A plurality of vertical recesses 20 are provided in the central area 24 of the tailgate 12. When referring to the vertical recesses 20, the term "vertical" refers to the orientation of the recesses when the tailgate 12 is closed. When the tailgate 12 is open, the vertical recesses 20 actually extend in a horizontal plane.

Figure 2:
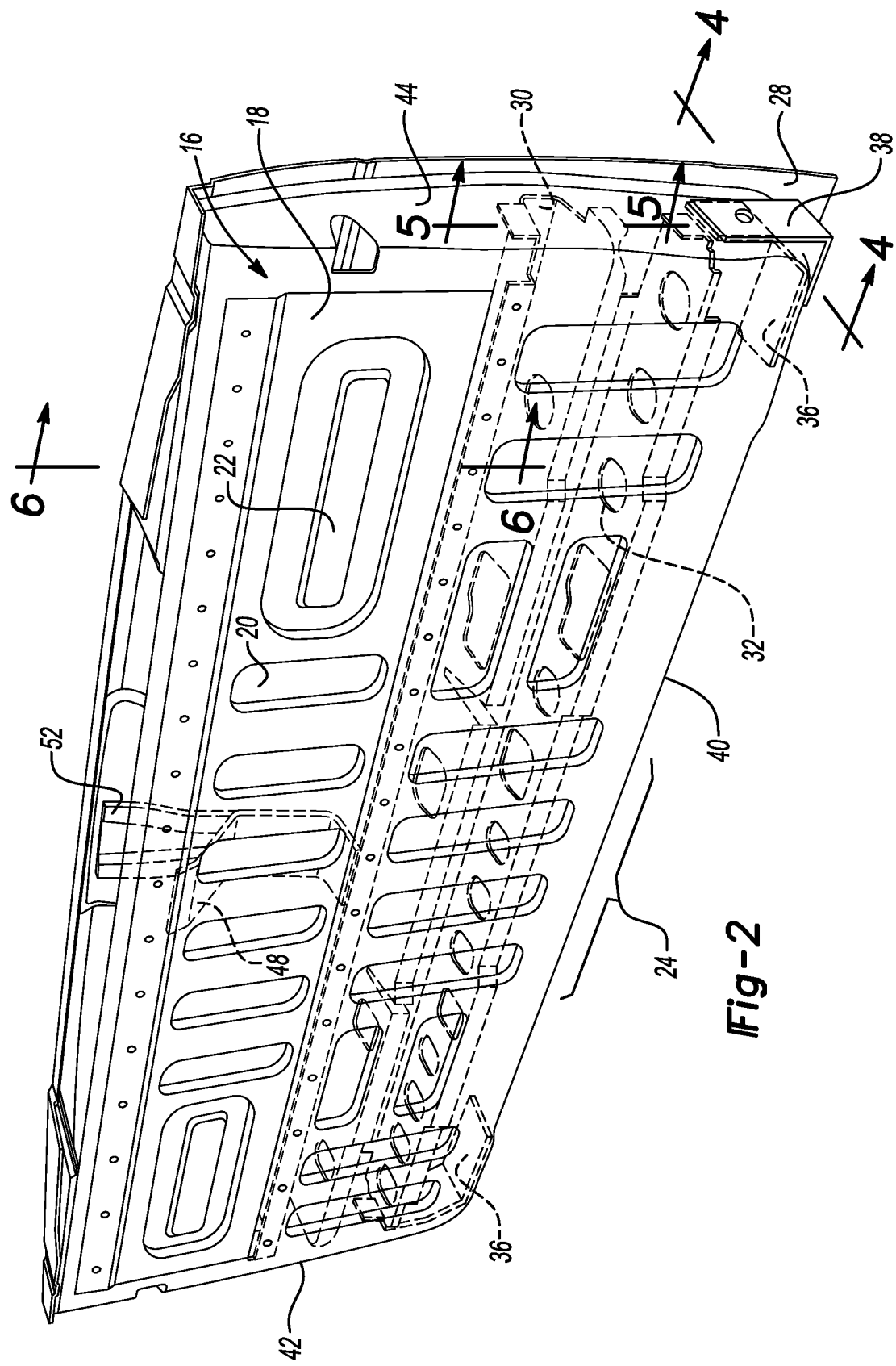
FIG. 2 is an inside perspective view of a tailgate assembly.
Figure 3:
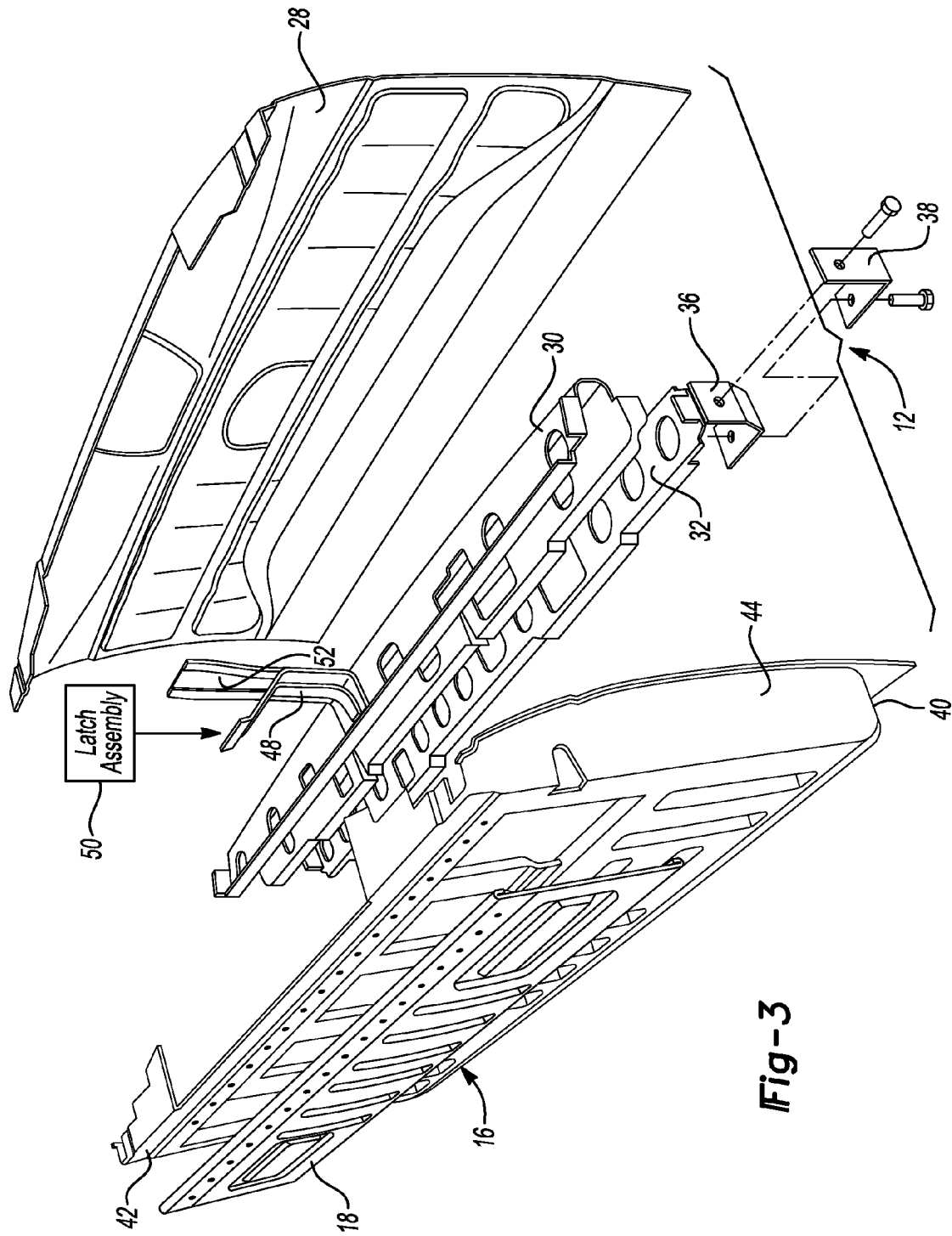
FIG. 3 is an exploded perspective view of the tailgate assembly shown in FIG. 2.

Referring to FIGS. 2 and 3, a tailgate is generally indicated by reference numeral 12 and includes the inner panel 16 and access panel 18 as described above with reference to FIG. 1. An outer panel 28 is shown separated from the inner panel 16 and the access panel 18 is also separated from the inner panel 16. A transversely extending reinforcement 30, or upper strainer, is shown between the inner panel 16 and outer panel 28. A lower transversely extending reinforcement 32, or lower strainer, is shown below the transversely extending reinforcement 30.

Two hinge reinforcement brackets 36 are shown in FIG. 2. While only one hinge reinforcement bracket 36 is shown in FIG. 3, it should be understood that a mirror image of the hinge reinforcement bracket 36 and hinge plate 38 would be provided on the opposite side of the tailgate 12. A hinge plate 38 is attached to the hinge reinforcement bracket 36 through the inner panel 16.

The inner panel 16 includes a bottom wall 40 and a right sidewall 42 on the right side of the tailgate 12. References to the right and left side herein refer to the right and left side of the vehicle when facing forward. A left sidewall 44 is formed as part of the inner panel 16. The bottom wall 40 extends between the right sidewall 42 and the left sidewall 44.

A latch bracket 48 is assembled to the transversely extending reinforcement 30. A latch assembly 50 is schematically represented and is shown to be attached to the latch bracket 48. The latch assembly 50 may be a mechanical latch including links that extend to the right sidewall 42 and left sidewall 44. Alternatively, the latch assembly 50 may be an electronic latch assembly that is electrically connected to latch solenoids associated with the right sidewall 42 and left sidewall 44. A handle reinforcement 52 extends upwardly from the latch bracket 48 and is provided to reinforce the area of the outer panel 28 where a handle (not shown) is secured to the tailgate 12.

Figure 4:
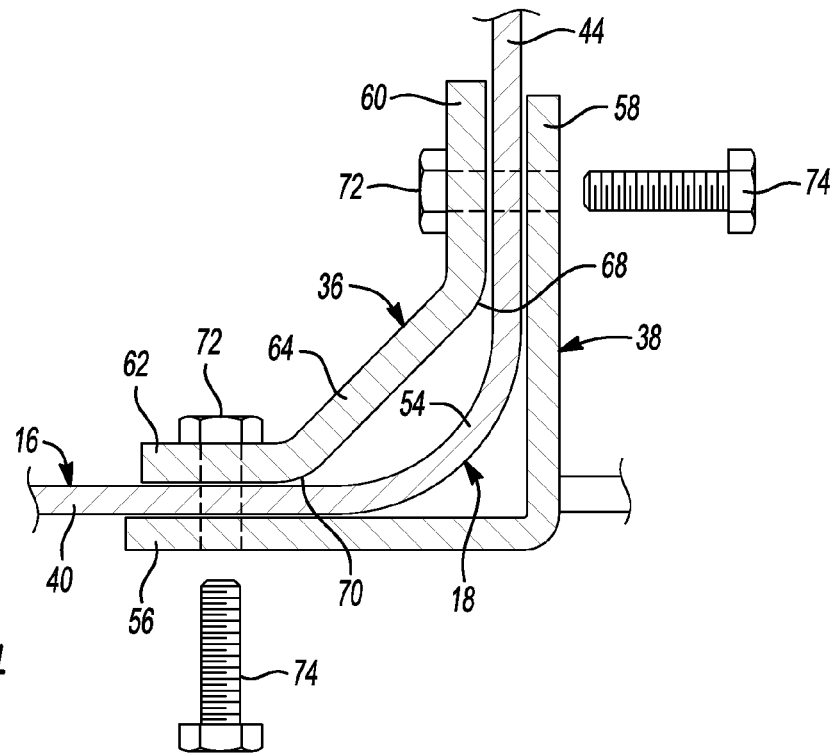
FIG. 4 is a cross-sectional view taken along the line 4-4 in FIG. 2.

Referring to FIG. 4, a lower corner 54 of the inner panel 16 is illustrated in cross-section to show the reinforcement structure for the hinge. The hinge plate 38 includes a transverse leg 56 and a vertical leg 58. The transverse leg 56 is attached to the bottom wall 40 of the inner panel 16. The vertical leg 58 is attached to the left sidewall 44 of the inner panel 16. The hinge reinforcement bracket 36 includes a sidewall flange 60 that is attached inside the inner panel 16 and is attached in a face-to-face relationship with the left sidewall 44 of the inner panel 16 and the vertical leg 58 of the hinge plate 38. The hinge reinforcement bracket 36 also includes a bottom flange 62 that is attached inside the bottom wall 40 of the inner panel 16 and the transverse leg 56 of the hinge plate 38. The bottom flange 62, bottom wall 40 and transverse leg 56 are assembled together in a face-to-face relationship. An intermediate portion 64 of the hinge reinforcement bracket 36 extends diagonally between the sidewall flange 60 and the bottom flange 62 of the hinge reinforcement bracket 36. The intermediate portion 64 forms the hypotenuse of a triangular area bounded by the transverse leg 56 and vertical leg 58 of the hinge plate 38. The intermediate portion 64 defines a clearance relative to the lower corner 54 of the inner panel 16. A clearance is also defined between the lower corner 54 and the hinge plate 38 on the outer side of the inner panel 16. The clearances allow for tolerance stack-up and variation in the shape of the lower corner 54 in the course of the drawing process and may accommodate any spring-back that occurs subsequent to forming the inner panel 16.

An upper radiused area 68 is provided between the intermediate portion 64 and the sidewall flange 60. A lower radiused area 70 is provided between the intermediate portion 64 and the bottom flange 62. The radiused areas 68 and 70 also facilitate assembly by permitting a limited degree of play when assembling the hinge reinforcement bracket 36 inside the lower corner 54 of the inner panel 16. Clinch nuts 72 are secured to the sidewall flange 60 and bottom flange 62 and are adapted to receive threaded fasteners 74 that are inserted through holes formed in the hinge plate 38, bottom wall 40 and left sidewall 44 of the inner panel 16. Holes are also provided in the sidewall flange 60 and bottom flange 62. The fasteners 74 secure the hinge reinforcement bracket 36 to the inner side of the inner panel 16 at the lower corner 54 while the hinge plate 38 is assembled over the lower corner 54 of the inner panel 16 to partially enclose the outer surface of the lower corner 54. The hinge plate 38 is preferably formed of steel or other durable alloy while the hinge reinforcement bracket 36 and inner panel 16 are formed of an aluminum alloy to reduce vehicle weight. The other major components of the tailgate 12 are also formed of aluminum, including the transversely extending reinforcement 30 and lower transversely extending reinforcement 32.

Figure 5:
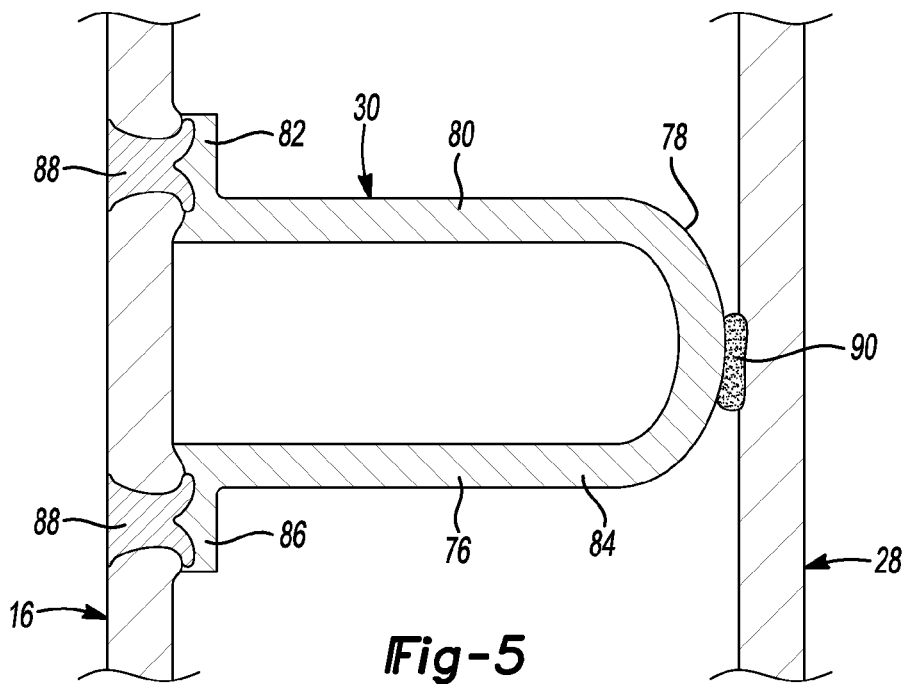
FIG. 5 is a cross-sectional view taken along the line 5-5 in FIG. 2.

Referring to FIG. 5, the transversely extending reinforcement 30 is shown as it is assembled between the inner panel 16 and outer panel 28. The transversely extending reinforcement 30 is formed with a U-shaped body 76 having a radiused surface 78 that is adapted to be adhesively bonded to the outer panel 28. An upper leg 80 having an upper flange 82 extend from the outer panel 28 to the inner panel 16 on the upper side of the transversely extending reinforcement 30. A lower leg 84 having a lower flange 86 extend from the outer panel 28 to the inner panel 16 below the upper leg 80. The upper flange 82 and lower flange 86 are secured by self-piercing rivets 88 that extend through the inner panel 16 and into the upper flange 82 and lower flange 86. While self-piercing rivets 88 are illustrated in FIG. 5, it should be understood that other one-sided fasteners may be incorporated or it is also possible that the fasteners may be conventional threaded fasteners that are received in clinch nuts or the like to hold the transversely extending reinforcement 30 in engagement with the inner panel 16. A structural adhesive 90 is applied between the radiused surface 78 of the U-shaped body 76 and the outer panel 28. Structural adhesive 90 is used to attach the outer panel to the reinforcement 30 without providing a visible fastener or mark on the outer surface of the outer panel 28.

Figure 6:
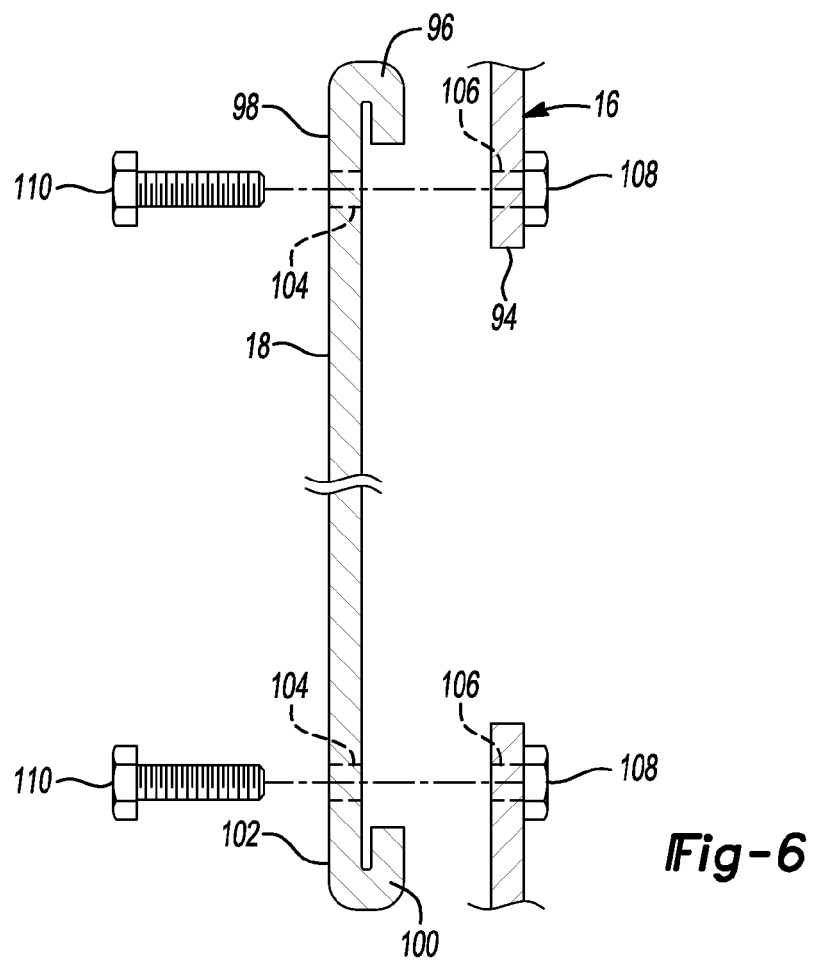
FIG. 6 is a cross-sectional view taken along the line 6-6 in FIG. 2.

Referring to FIG. 6, the access panel 18 is shown detached from the inner panel 16. An access opening 94 is defined by the inner panel 16 that is covered by the access panel 18 when the access panel 18 is assembled to the inner panel 16. The access panel includes an upper hem 96 that is formed in an upper flange 98 of the access panel 18. A lower hem 100 is formed on the lower flange 102 of the access panel 18. Fasteners openings 104 are formed in the upper flange 98 and the lower flange 102 that are inset on the access panel 18 relative to the upper hem 96 and the lower hem 100. The fastener openings 104 are aligned with holes 106 formed in the inner panel 16 and clinch nuts 108 are provided inside the inner panel 16 in alignment with the fastener openings 104 and holes 106. Fasteners 110 are inserted through the access panel 18 and the inner panel 16 and are tightened into the clinch nuts 108 to assemble the access panel 18 to the inner panel 16 after the tailgate is assembled with the latch assembly 50 and other internal components of the tailgate 12 are assembled. The access panel 18 may be removed to provide access for servicing internal components of the tailgate 12.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pick-up truck tailgate comprising:
   an outer panel;
   an inner panel attached to the outer panel;
   a transversely extending reinforcement including a U-shaped body having a radiused surface between an upper leg having an upper flange and a lower leg having a lower flange, wherein the radiused surface is connected with an adhesive to an inner surface of the outer panel and the upper and lower flanges are connected by fasteners to the inner panel;
   a lower transversely extending reinforcement assembled between the inner and outer panels and disposed below the transversely extending reinforcement;
   a latch bracket connected to and extending upwardly from the upper leg of the reinforcement that is adapted to support a latch assembly for latching the tailgate in a closed position; and
   a handle reinforcement, wherein a lower end of the handle reinforcement is attached to the latch bracket, and the handle reinforcement extends to the outer panel and an upper end of the handle reinforcement is attached to the outer panel.

2. The tailgate of claim 1 wherein the latch assembly is a mechanical latch assembly.

3. The tailgate of claim 1 wherein the latch assembly is an electronic latch assembly.

4. A pick-up truck tailgate comprising:
   an outer panel;
   an inner panel defining an access opening;
   an access cover having an upper hem formed on an upper flange and a lower hem formed on a lower flange, the access cover defining a plurality of fastener openings on the flanges that are spaced from the hem; and
   a plurality of fasteners inserted into the fastener openings to connect the access cover to the inner panel.

5. The tailgate of claim 4 wherein the access cover extends transversely across the inner panel from a right sidewall to a left sidewall.

6. The tailgate of claim 4 wherein the access cover is removable to provide access to a latch assembly and a handle assembly for assembly and service.

7. The tailgate of claim 4 further comprising a plurality of vertically extending recesses formed in the access cover in a central area of the access cover to increase stiffness of the access cover.

8. The tailgate of claim 4 further comprising a plurality of vertically extending recesses formed in the inner panel in a central area of the inner panel to increase stiffness of the inner panel.

9. The tailgate of claim 8 further comprising a plurality of horizontally extending recesses formed in the inner panel on opposite lateral sides of the central area of the inner panel to increase stiffness of the inner panel.

* * * * *